UNITED STATES PATENT OFFICE.

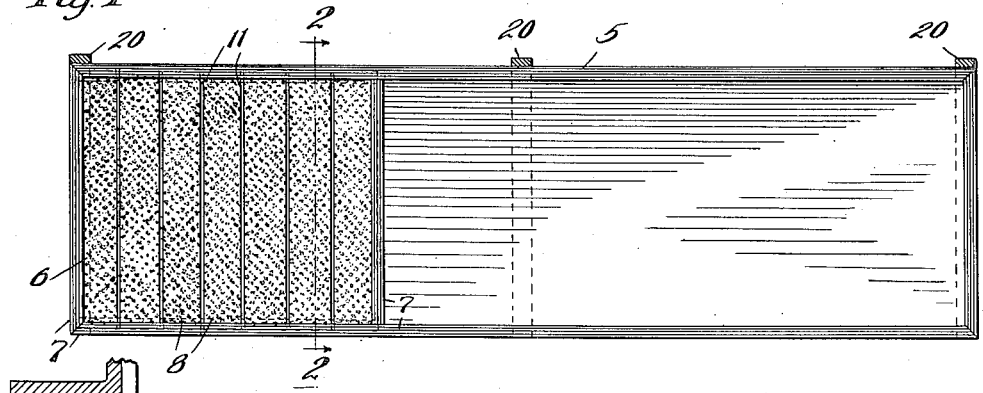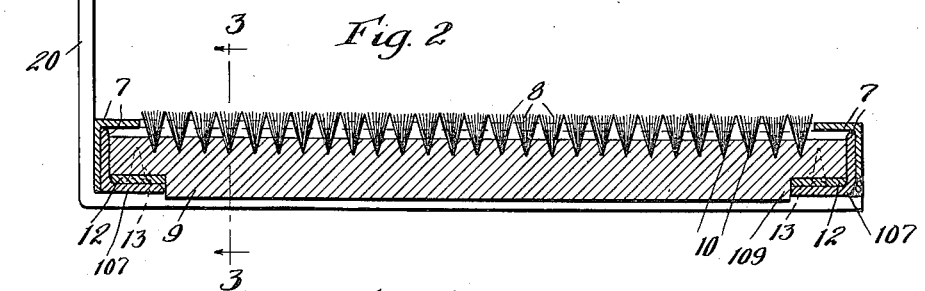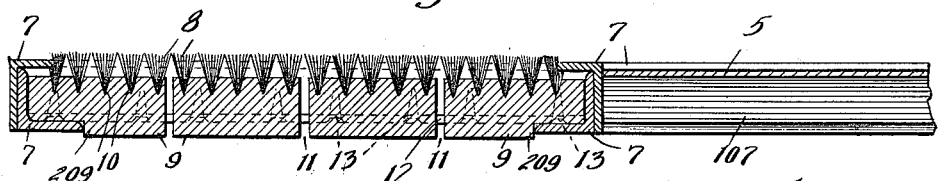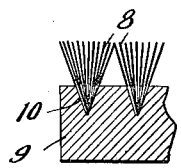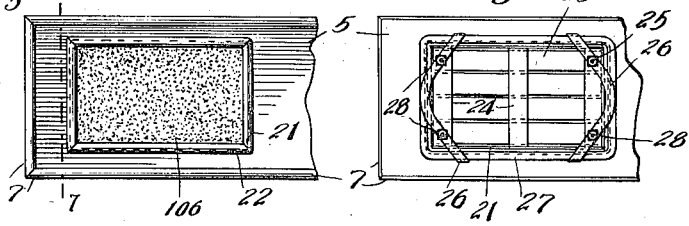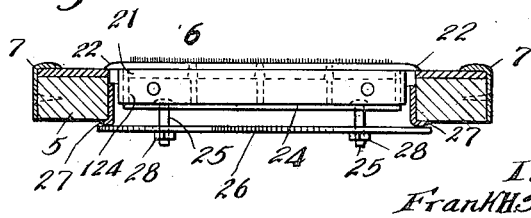

FRANK H. STANWOOD, OF ARLINGTON, MASSACHUSETTS.

STEP FOR AUTOMOBILES AND OTHER VEHICLES.

1,144,439.  Specification of Letters Patent.  Patented June 29, 1915.

Application filed May 2, 1913. Serial No. 764,993.

*To all whom it may concern:*

Be it known that I, FRANK H. STANWOOD, a citizen of the United States, residing in Arlington, in the county of Middlesex and State of Massachusetts, have invented a new and useful Improvement in Steps for Automobiles and other Vehicles, of which the following is a specification.

This invention relates to improvements in steps for automobiles and other vehicles.

One object of my invention is to construct the tread surfaces of running-boards and steps usually employed upon the sides of automobiles and other vehicles, so that they will automatically tend to loosen and dislodge from the shoes of the persons using the vehicles, any snow or dirt adhering to the shoes, and to this end I form the tread surface preferably from specially prepared cactus fiber arranged in upright position in a suitable support, the fiber being arranged in closely associated bunches, the points or extremities of the fibers projecting above and substantially entirely covering the support so that such projecting portions when stepped upon, will bend slightly and be forced into the snow or dirt adhering to the shoes.

The invention furthermore consists in the improvements in the parts and devices and in the novel combinations of the parts and devices herein shown, described or claimed.

In the drawing forming a part of this specification, Figure 1 is a plan view of a running-board for automobiles showing the same provided with my improvements. Fig. 2 is an enlarged transverse section taken substantially on the line 2—2 of Fig. 1. Fig. 3 is a section taken substantially on the line 3—3 of Fig. 2. Fig. 4 is a detailed enlarged section showing the manner of securing the fiber in position. Fig. 5 is a plan view of a modified construction showing my improvements. Fig. 6 is a bottom plan view of the form shown in Fig. 5, and Fig. 7 is an enlarged transverse sectional view taken substantially on the line 7—7 of Fig. 5.

In said drawing, 5 represents the running-board of an automobile or other vehicle, the same being provided with a portion 6 embodying my improvements, said portion 6 forming the step directly in front of one of the side doors of the automobile. The running-board has a surrounding frame 7 which may be of any desired construction and is supported from the automobile body by hangers 20. The portion 6 of the running-board has its surface composed of cactus fiber 8 arranged in bunches closely associated together, as shown, so that the upper ends of the fiber will be spread so as to practically entirely cover the upper surface of the transversely extending boards 9. As shown more clearly in Fig. 4 the individual fibers, which are preferably chemically prepared so that they are impervious to moisture, composing the bunches are doubled at their centers and inserted in tapering recesses or seats 10 in the boards 9, the bunches then being fastened in the recesses in any one of the ways now commonly in use in brush making, as for instance by stapling the bunches to the boards in which they are seated, or by pouring liquid rubber or cement into the recesses and allowing it to set. The boards 9, as shown, extend transversely of the running-board and are spaced apart as indicated at 11, so that snow, ice and dirt which may fall upon them may have abundant opportunity to fall through and escape to the ground, and furthermore to provide means for drawing off the water when the vehicle is being cleaned. The ends of the boards 9 are rabbeted, as shown at 109, and are secured to longitudinally extending plates 12 as by means of screws 13 and supported on angle irons 107, see Fig. 2, forming a part of the frame 7. The end boards 9 are also rabbeted, as shown at 209, in order to be made flush with the intermediate boards 9.

In order to facilitate repairing, replacing and cleaning of the parts subjected to the most wear, I may adopt the construction illustrated in Figs. 5 to 7, inclusive, wherein the running-board 5 is provided with a portion 106 that receives the greatest amount of wear, said portion 106 being constructed as follows and readily removable and replaceable: The portion 106 comprises a frame 21, corresponding in shape and size to the opening cut in the running-board 5, said frame 5 having a laterally extending flange 22 around its top edge adapted to engage and over-lap the top of the running-board around the opening and preventing the tread portion from falling through as shown most clearly in Fig. 7. Mounted within said frame 21 are a plurality of longitudinally extending boards 23, each provided with bunches of cactus fiber arranged as in the structure illustrated in Figs. 1 to 4, inclusive, the boards 23 being also suitably spaced apart and held in the frame 21 by metal straps 24, the boards 23 being secured to the straps 24 by screws or other suitable devices and the straps 24 having up-turned ends 124 secured to the inner side of the frame 21, see Fig. 7. In order to hold the tread portion 106 in position, bolts 25 are provided which extend down from the straps 24, said bolts 25 passing through suitable perforations in triangular-shaped clamping irons 26, the latter having their outer ends and apices engaging a metal wear-plate 27 secured to the running-board and extending around the opening therein, the tread portion 106 being adjustably secured to the clamping irons 26 as by nuts 28.

From the preceding description, it will be seen that the tread portions 6 and 106 form a continuous unbroken surface with the rest of the running-board 5, that the arrangement of the bunches of fiber is such that the same will readily yield under the person's weight and will engage and knock off dirt, snow, etc., on the person's shoes, that the spacing part of the boards 9 and 23 permits the dirt to readily fall out, that the tread portion 106 is readily removable for repairs or cleaning and that the construction described is particularly desirable because it does not weaken the running-board or step to which it is applied. As will be understood, the tread portion may be duplicated on the same running-board where the running-board extends past two doors of an automobile.

Although I have herein shown and described what I now consider the preferred embodiment of my improvements, yet it will be understood that various changes and modifications may be made without departing from the spirit of the invention, and all such changes and modifications are contemplated as come within the scope of the claims appended hereto.

I claim:

1. A running-board for automobiles and other vehicles, the running-board having an opening therein, a plurality of boards supported in said opening, the boards being spaced apart to thereby permit accumulated dirt to be washed therethrough and each board having a flat tread surface composed of fiber strips, the tips of the fiber strips being arranged to form a continuation of the remaining surface of the running-board, substantially as specified.

2. A running-board for automobiles and other vehicles, said running-board having an opening therein and a tread surface detachably supported in said opening, said tread surface comprising a plurality of members spaced apart and each provided with a yieldable surface adapted to loosen foreign matter from the shoes of persons stepping thereon, said tread surface being arranged to form a flat continuous, substantially unbroken surface with the rest of the running-board, substantially as specified.

3. A running-board for automobiles and other vehicles having an opening therethrough and a tread surface detachably supported therein, said tread surface comprising a plurality of spaced boards rigidly held together in proper relation with respect to each other by metal straps whereby all of said boards are removable simultaneously, and means for detachably holding said tread surface in position. the tread surface comprising fiber strips, the tips of which are exposed and arranged to form a flat substantially unbroken surface with the rest of the running-board, substantially as specified.

Signed this 28th day of April, 1913.

FRANK H. STANWOOD.

Witnesses:
THOMAS J. ROBINSON,
EDNA C. PIERCE.